United States Patent [19]

Mochizuki et al.

[11] Patent Number: 5,169,556
[45] Date of Patent: Dec. 8, 1992

[54] LIQUID CRYSTAL COMPOSITION

[75] Inventors: Akihiro Mochizuki, Atsugi; Mitsuaki Hirose, Tatebayashi; Hideo Hama, Ichihara; Masakatsu Nakatsuka, Yokohama, all of Japan

[73] Assignees: Fujitsu Limited, Kawasaki; Mitsui Toatsu Chem., Inc., Tokyo, both of Japan

[21] Appl. No.: 542,099

[22] Filed: Jun. 22, 1990

[30] Foreign Application Priority Data

Jun. 24, 1989 [JP] Japan ................. 1-161149

[51] Int. Cl.$^5$ ................. C09K 19/32; C09K 19/52; G02F 1/13
[52] U.S. Cl. ................. 252/299.62; 252/299.01; 252/299.66; 359/104
[58] Field of Search ................. 350/350 R, 350 S; 252/299.62, 299.66

[56] References Cited

U.S. PATENT DOCUMENTS

| | | | |
|---|---|---|---|
| 3,925,237 | 12/1975 | Ross | 252/299.62 X |
| 4,340,498 | 7/1982 | Sugimori | 252/299.5 |
| 4,386,007 | 5/1983 | Krause et al. | 252/299.62 |
| 4,391,731 | 6/1983 | Boller et al. | 252/299.62 |
| 4,613,209 | 9/1986 | Goodby et al. | 350/350 S |
| 4,680,137 | 7/1987 | Isoyama et al. | 252/299.62 |
| 4,696,759 | 9/1987 | Isoyama et al. | 252/299.62 |
| 4,867,903 | 9/1989 | Nohira et al. | 252/299.61 |
| 4,886,619 | 12/1989 | Janulis | 252/299.1 |
| 4,906,402 | 3/1990 | Jackson et al. | 252/299.65 |
| 4,921,632 | 1/1990 | Nakamura et al. | 252/299.1 |
| 4,932,758 | 6/1990 | Hanyn et al. | 350/350 S |
| 5,047,757 | 9/1991 | Bone et al. | 340/784 |

FOREIGN PATENT DOCUMENTS

| | | | |
|---|---|---|---|
| 0339987 | 11/1989 | European Pat. Off. | 252/299.66 |
| 0049315 | 3/1985 | Japan | 350/350 R |
| 0303324 | 12/1988 | Japan | 350/350 R |
| 1-193390 | 8/1989 | Japan | 252/299.62 |
| 8705018 | 8/1987 | World Int. Prop. O. | |

Primary Examiner—Robert L. Stoll
Assistant Examiner—C. Harris
Attorney, Agent, or Firm—Staas & Halsey

[57] ABSTRACT

A ferroelectric liquid crystal is formed by incorporating, as the main component, a predetermined amount of a ferroelectric liquid crystal having a specific naphthalene ring structure into conventional liquid crystals. This liquid crystal composition has a broad driving temperature range and in particular, can be effectively driven even in a low-temperature region. Moreover, this liquid crystal composition has a high orientation uniformity, a high memory stability, and a high contrast ratio.

16 Claims, 5 Drawing Sheets

BOOKSHELF STRUCTURE

BOOKSHELF STRUCTURE

CHEVRON STRUCTURE

PORTION OF ORIENTATION DEFECT

X-RAY DIFFRACTION DIAGRAM OF CONVENTIONAL LIQUID CRYSTAL

X-RAY DIFFRACTION DIAGRAM OF LIQUID CRYSTAL COMPOSITION OF PRESENT INVENTION

LIQUID CRYSTAL COMPOSITION

BACKGROUND OF THE INVENTION (1) Field of the Invention

The present invention relates to a liquid crystal composition. More particularly, the present invention relates to a liquid crystal composition in which an improved orientation, high contrast, high memory stability, and high-speed response are obtained by using a conventional liquid crystal and a liquid crystal having a specific naphthalene structure as main components, and mixing same at a predetermined ratio.

Furthermore, the present invention relates to a ferroelectric liquid crystal display device comprising the above liquid crystal composition.

(2) Description of the Related Art

Since a liquid crystal display element is a plate type element with a small power consumption, the liquid crystal display element is widely used as a display element of a word processor, a lap top computer or the like. Especially, a super twisted nematic (STN) liquid crystal display element can be applied to a display having a relatively large display capacity such as 640×400 dots, and is widely used for personal computers and the like.

Nevertheless, as the display capacity of the liquid crystal display increases and applications to word processors or personal computers having an enhanced performance are attempted, the application of a conventional STN becomes difficult because it has an unsatisfactory display background color and viewing field angle.

As a display system proposed for overcoming these defects of the conventional liquid crystal display, a ferroelectric liquid crystal display (FLCD) was proposed [N.A. Clark and S.T. Largerwall, J. Applied Physics Letters, 36, 899 (1980)].

Also U.S. Pat. No. 4,367,927 (Noel A. Clark) discloses "Chiral Smectic C or H Liquid Crystal Electro-Optical Device", wherein a liquid crystal electro-optical device comprising:

a quantity of chiral, at least one of smectic C and smectic H, liquid crystal having a plurality of adjacently disposed layers each comprised of a plurality of molecules, each molecule having a long axis;

first and second means, perpendicular to and contiguous with said layers, for aligning the long axes of said molecules adjacent to said first and second means parallel to said first and second means, said molecules of said layers in a bulk of said liquid crystal forming helixes having axes perpendicular to said layers, the distance between said first and second means being less than the distance at which said helixes form in the absence of an electric field, said first and second means causing said long axes to assume one of a first and second stable orientation;

means for applying an electric field to at least a portion of said layers, said electric field being parallel to said layers and perpendicular to said first and second means, and for reversing the direction of said electric field, the strength of said electric field being sufficient to shift the long axis of molecules in said portion of said layers from said first orientation to said second orientation upon application of said electric field in a direction reversed from the direction of said electric field previously applied; and means for processing light passing through said liquid crystal so that light passing through portions of said liquid crystal having said first orientation can be distinguished from light passing through portions of said liquid crystal having said second orientation, indicated.

FLCD shows a spontaneous polarization because the polarizations of liquid crystal molecules are oriented in one direction, and since this spontaneous polarization is reversed when the polarity of the applied electric field is reversed, FLCD shows ferroelectric characteristics. Accordingly, as the drive method, a method is adopted in which the spontaneous polarizations of liquid crystal molecules are oriented in one direction by applying a pulse wave form electric field having a negative polarity, the display contents are held by the memory effect of the liquid crystal, i.e., the property whereby after the orientation of the polarizations, the ferroelectric characteristic, that is, the direction of the spontaneous polarization, is not changed, and the direction of the spontaneous polarization is first changed by an application of an electric field having a reverse polarity. Therefore, in FLCD, the memory effect must be kept stable, but in the conventional ferroelectric liquid crystals, a satisfactory memory effect necessary for stable driving cannot be obtained, or if obtained, the response time is long and the characteristics of FLCD are not fully utilized.

A surface stabilized ferroelectric liquid crystal display (SSFLCD) is recognized as having a great possibilities with regard to a high information content, wide viewing angle, high contrast ratio, and fast switching. To realize a high performance SSFLCD, much research has been carried out into the development of liquid crystal materials, driving methods, and liquid crystal molecular orientations.

Nevertheless, the SSFLCD is still under development, mainly because the layer structure of the SSFLCD is a "chevron" not a "bookshelf" structure, and because of this structure, the SSFLCD shows "zig zag defects", (Y.Ouchi, J. Lee, H. Takezoe, A. Fukuda, K. Kondo, T. Kitamura and A. Mokoh, J.J.A.P. 27 L1993 (1988)), resulting in a poor contrast ratio and unstable bistability.

A "bookshelf" structure obtained by an oblique deposition technique has been reported (M. Johno, A. D. L. Chandani, Y. Ouchi, H. Takezoe, A. Fukuda, M. Ichihashi and K. Furukawa, J.J.A.P. 28 L119 (1989)), but a bookshelf structure with a rubbed polymer film cell and suitable for a mass production of the SSFLCD has not been reported.

Accordingly, the development of a liquid crystal material maintaining a high-speed response characteristic, a characteristic of FLCD, and having a satisfactorily stable memory effect is desired in the art.

A mixture composed mainly of an ester compound and a phenylpyrimidine compound is mainly used for the conventional FLCD, but a satisfactorily stable memory effect cannot be obtained by any of the known compositions of this type. The main reason for this is that, since a compatible Coulomb mutual action (interaction) is not effected in the interface between each liquid crystal molecule and the substrate, microdomains are formed, or if a certain orientation is obtained, many zigzag defects are generated as described hereinafter.

Under this background, the inventors proposed an FLCD in which a high-speed response characteristic and a stable memory effect can be manifested by using a naphthalene type liquid crystal having a naphthalene ring in the core unit portion of the liquid crystal molecule (Unexamined Japanese Patent No. TOKKAIHEI 1-101389). The naphthalene type liquid crystal is a material which is different from conventional FLCD, in that the generation of zigzag defects is not observed, and in which a liquid crystal orientation having an excellent uniformity can be manifested, and further, the naphthalene type liquid crystal has a much better memory characteristic than those of the conventional liquid crystal materials.

In general, however, the naphthalene type liquid crystal has a high viscosity, and an increase of the viscosity is especially conspicuous at temperatures lower than 15° C., and therefore, the naphthalene type liquid crystal is defective in that the response time is abruptly lengthened in a low-temperature range (lower than 10° C.).

Accordingly, the inventors searched for a liquid crystal material retaining the characteristic of conventional liquid crystals, i.e., a relatively low viscosity in a low-temperature region, and having the good orientation and memory characteristics inherently possessed by the naphthalene type liquid crystal. First, a mixture of a conventional phenylpyrimidine type mixed liquid crystal with the naphthalene type liquid crystal was examined, and as a result, it was confirmed that the compatibility between the phenylpyrimidine liquid crystal and the naphthalene type liquid crystal is generally poor and the ferroelectric phase-showing temperature range is narrowed by the mixing. Accordingly, the inventors tried to obtain a stable memory characteristic in a broad ferroelectric phase-showing temperature range by mixing various naphthalene type liquid crystals into conventional liquid crystals as the base, but it was found that naphthalene type liquid crystals differ in their compatibility with the conventional liquid crystals according to the difference of the molecular structure, and that the intended effects of the present invention can be attained by a novel liquid crystal composition formed by combining the liquid crystals described below. The present invention is based on this finding.

The research objectives of the present inventors were as follows.

First, to clarify the relationships between the molecular structure and layer structure of the liquid crystal, and then to obtain a bookshelf structure; second to investigate dependence of the layer structure on the electro-optical properties thereof; and third, to obtain a high contrast ratio and stable bistability with the bookshelf layer structure of the SSFLCD with a rubbed polymer film.

SUMMARY OF THE INVENTION

A primary object of the present invention is to provide a liquid crystal composition in which an improvement of the orientation of the ferroelectric liquid crystal display (elimination of zigzag defects and attainment of a high uniformity in the display plane), a stabilization of the memory effect, and an improvement of the contrast ratio are satisfactorily obtained.

To realize this object, according to the present invention, the chevron structure (see FIG. 2), which is the conventional liquid crystal layer structure, is changed to the bookshelf structure (see FIG. 1).

A secondary object of the present invention is to provide a liquid crystal composition having a bookshelf structure and has satisfactory characteristics required for liquid crystal materials from the practical viewpoint, such as the driving temperature and the liquid crystal viscosity.

A third object of the present invention is to provide a liquid crystal composition having a satisfactory spontaneous polarization while obtaining the foregoing primary and secondary objects.

A fourth object of the present invention is to provide a liquid crystal display device comprising the above-mentioned liquid crystal composition of the present invention.

In accordance with one fundamental aspect of the present invention, the foregoing objects can be obtained by a liquid crystal composition comprising (1) 5 to 60% by weight of at least one member selected from the group consisting of compounds represented by the following formula (I):

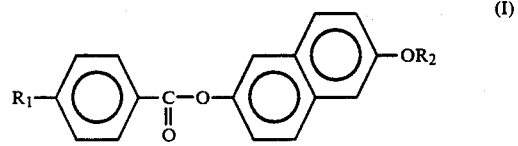

wherein $R_1$ represents an alkyl or alkoxy group having 6 to 16 carbon atoms, and $R_2$ represents an alkyl group having at least one asymmetric carbon atom and 4 to 13 carbon atoms, which may be substituted with an alkoxy group having 1 to 6 carbon atoms, (II) 5 to 60% by weight of at least one member selected from the group consisting of compounds represented by the following general formula (II):

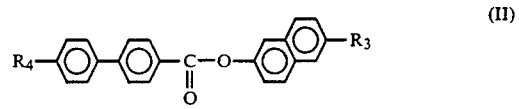

wherein $R_3$ represents an alkyl or alkoxy group having 6 to 16 carbon atoms, and $R_4$ represents an alkyl or alkoxy group having at least one asymmetric carbon atom and 4 to 13 carbon atoms, (III) 5 to 60% by weight of at least one member selected from the group consisting of compounds represented by the following formula (III):

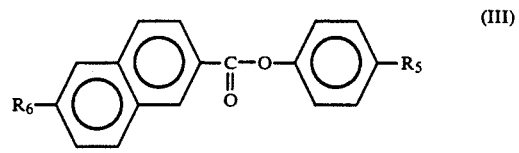

wherein $R_5$ represents an alkyl or alkoxy group having 6 to 16 carbon atoms, and $R_6$ represents an alkyl or alkoxy group having at least one asymmetric carbon atom and 4 to 13 carbon atoms, and (IV) 5 to 70% by weight of at least one member selected from the group consisting of compounds represented by the following formulae (IV-1) through (IV-5):

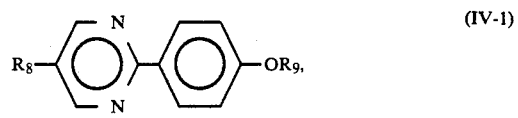

-continued

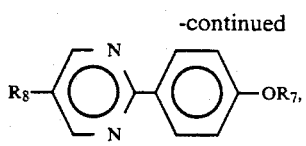 (IV-2)

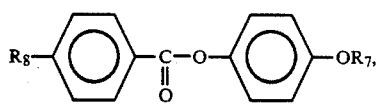 (IV-3)

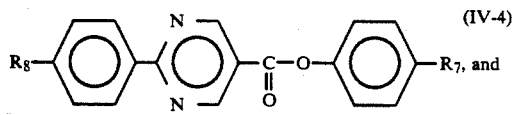 (IV-4)

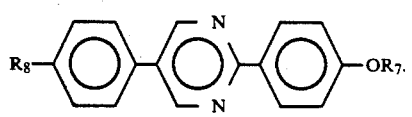 (IV-5)

wherein $R_8$ and $R_9$ represent an alkyl group having 6 to 16 carbon atoms, and $R_7$ represents an alkyl group having at least one asymmetric carbon atom and 4 to 13 carbon atoms.

In accordance with another aspect of the present invention, there is provided a liquid crystal composition, which further comprises (V) 5 to 40% by weight of at least one member selected from the group consisting of compounds represented by the following formulae (V-1) and V-2):

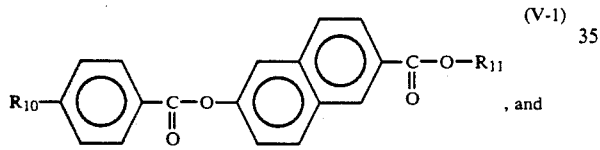 (V-1)

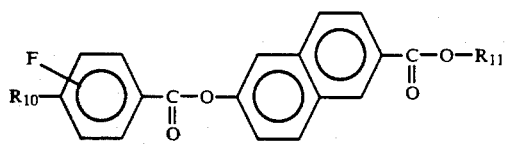 (V-2)

wherein $R_{10}$ represents an alkyl or alkoxy group having 6 to 16 carbon atoms, and $R_{11}$ represents an alkyl group having at least one asymmetric carbon atom and 4 to 13 carbon atoms, in addition to the foregoing compounds (I) through (IV).

This liquid crystal composition of the second aspect of the present invention has been completed based on the finding that the compound of group (V) has a strong effect of expanding the spontaneous polarization, and in this liquid crystal composition, by incorporating the compound of group (V) into compounds (I) through (IV), the response speed of the liquid crystal is further increased within a range at which the viscosity of the entire liquid crystal is not increased.

In accordance with one aspect of the present invention, there is provided a ferroelectric liquid crystal display device, comprising:

A liquid crystal panel, comprising:
a first transparent substrate;
a second transparent substrate substantially in parallel with the first transparent substrate;
first transparent electrode means formed on the internal surface of said first transparent substrate;
second transparent electrode means formed on the internal surface of said second transparent substrate;
a spacer between the first and second transparent substrates, said first and second transparent substrates and said spacer forming a enclosed space, said first and second transparent electrodes each having an internal surface facing the enclosed space;
first liquid crystal orienting means formed on the internal surface of said first transparent substrate;
second liquid crystal orienting means formed on the internal surface of said second transparent substrate;
a ferroelectric liquid crystal having a spontaneous polarization and forming a bookshelf smectic-C layer structure, charged in the enclosed space; and
means for causing the liquid crystal at selected portions of the panel to have a polarization of the liquid crystal molecules oriented in one direction and the liquid crystal at other portions of the panel to have a polarization of the liquid crystal molecules oriented in a reverse direction thereto, comprising means for applying a pulse wave form electric field alternately to the positive and negative sides by applying a pulse wave form electric voltage across the first and second electrodes, wherein said ferroelectric liquid crystal is a chiral smectic-C liquid crystal composition comprising (1) 5 to 60% by weight of at least one member selected from the group consisting of compounds represented by the following formula (I):

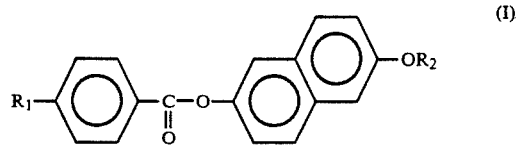 (I)

wherein $R_1$ represents an alkyl or alkoxy group having 6 to 16 carbon atoms, and $R_2$ represents an alkyl group having at least one asymmetric carbon atom and 4 to 13 carbon atoms, which may be substituted with an alkoxy group having 1 to 6 carbon atoms, (II) 5 to 60% by weight of at least one member selected from the group consisting of compounds represented by the following general formula (II):

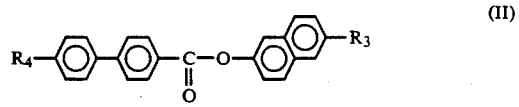 (II)

wherein $R_3$ represents an alkyl or alkoxy group having 6 to 16 carbon atoms, and $R_4$ represents an alkyl or alkoxy group having at least one asymmetric carbon atom and 4 to 13 carbon atoms, (III) 5 to 60% by weight of at least one member selected from the group consisting of compounds represented by the following formula (III):

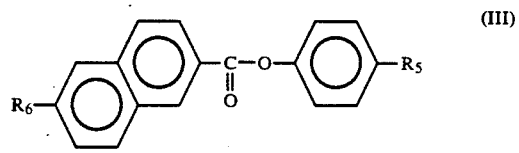 (III)

wherein $R_5$ represents an alkyl or alkoxy group having 6 to 16 carbon atoms, and $R_6$ represents an alkyl or alkoxy group having at least one asymmetric carbon atom and 4 to 13 carbon atoms, and (IV) 5 to 70% by weight of at least one member selected from the group consisting of compounds represented by the following formulae (IV-1) through (IV-5):

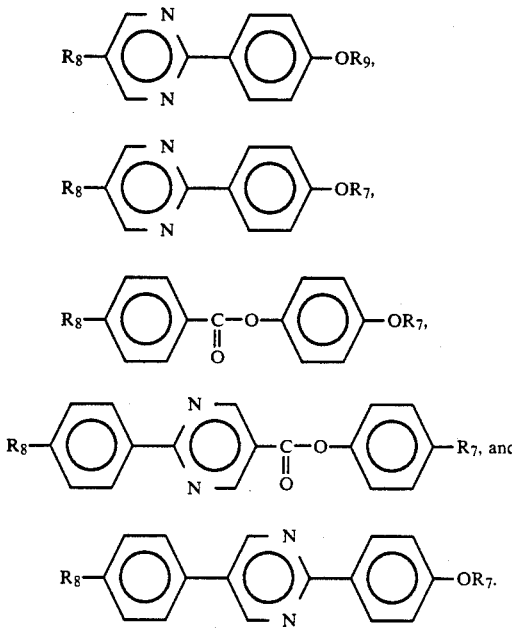

wherein $R_8$ and $R_9$ represent an alkyl group having 6 to 16 carbon atoms, and $R_7$ represents an alkyl group having at least one asymmetric carbon atom and 4 to 13 carbon atoms.

In accordance with another aspect of the invention, there is provided ferroelectirc liquid crystal display device, which further comprises (V) 5 to 40% by weight of at least one member selected from the group consisting of compounds represented by the following formulae (V-1) and V-2):

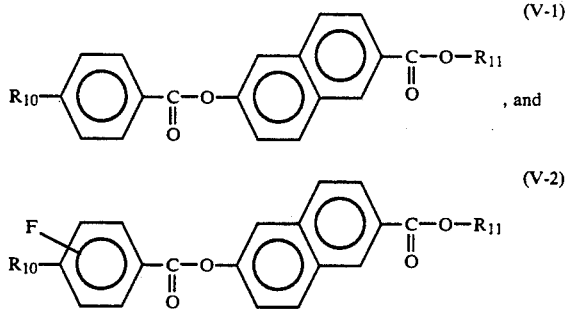

wherein $R_{10}$ represents an alkyl or alkoxy group having 6 to 16 carbon atoms, and $R_{11}$ represents an alkyl group having at least one asymmetric carbon atom and 4 to 13 carbon atoms, in addition to the foregoing compounds (I) through (IV).

In the present ferroelectric liquid crystal display device, the above-mentioned bookshelf smectic-C layer structure is perpendicular to the first and second substrates.

Also, in the present ferroelectric liquid crystal display device, the above-mentioned first and second liquid crystal orienting means comprise a polymer film subjected to the rubbing treatment.

Further, in the present above-mentioned ferroelectric liquid crystal display device, above-mentioned polymer film is formed of polyvinyl alcohol (PVA), polyimide, or polyamide.

DESCRIPTION OF THE PREFERRED EMBODIMENTS

The ferroelectric liquid crystal composition of the present invention comprises compounds of groups (I) through (IV) mentioned above, and may further comprise a compound of group (V).

The liquid crystal composition of the present invention will now be described with reference to the layer structure formed by the liquid crystal.

Note, in all of the compounds of groups (I) through (V), groups $R_1$ through $R_{11}$ may be either linear or branched.

Figure 1:
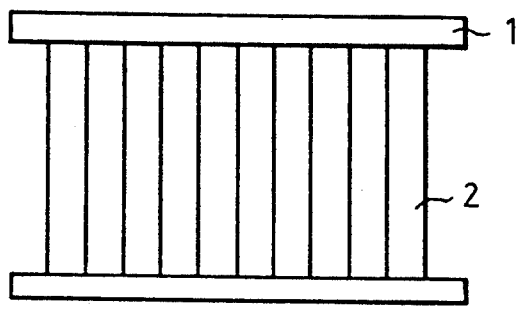
FIG. 1 illustrates a liquid crystal layer having a bookshelf structure.

Generally, in a display using a ferroelectric liquid crystal, the layer structure formed by the liquid crystal is ideally vertical to the substrate, as reported by Clark et al (see FIG. 1, in which reference numeral 1. represents the substrate and reference numeral 2 represents the layer structure). This structure is called a "bookshelf structure". In the display using a liquid crystal having this structure, the orientation is improved, a high contrast is obtained, the memory stability is improved, and a high-response characteristic is obtained.

Figure 2:
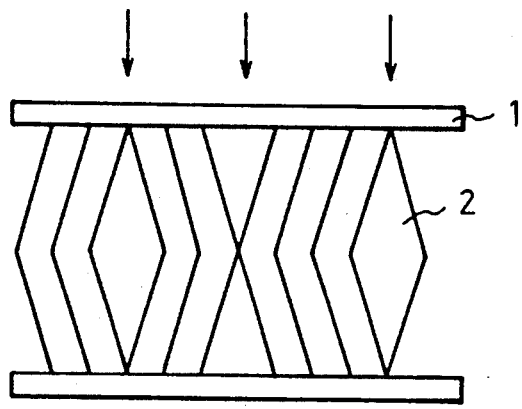
FIG. 2 illustrates a liquid crystal layer having a chevron structure.

In the conventional ferroelectric liquid crystal, however, it is known that, in practice, the layer is bent in a <-shaped form, as shown in FIG. 2 (in which reference numeral 1 represents the substrate and reference numeral 2 represents the layer structure). In the <-shaped bent structure (chevron structure), the inherent electrooptical switching of the ferroelectric liquid crystal does not occur, and the layer structure per se is unstable, and accordingly, a practical application of the liquid crystal to a display device is difficult. In the chevron structure, since the layer is bent, the polarizations of respective liquid crystal molecules cancel one another out, with the result that the macro spontaneous polarization is reduced and the response is delayed. Moreover, since the directions of respective molecules differ from one another, the polarization becomes unstable in the memory state and the memory characteristic is poor. Furthermore, where the bent parts of <-shaped layers are contiguous to each other (see FIG. 2), a domain wall called a disclination portion is generated because the state of the advance of light is changed at the boundary of the orientations of liquid crystal molecules. This disclination portion appears as a display defect (zigzag defect) which causes a reduction of the contrast.

Accordingly, the structure in which the layer is vertical to the substrate (bookshelf structure) is indispensable for realizing the inherent display of the ferroelectric liquid crystal. The present invention relates to a novel liquid crystal material in which the bookshelf structure can be constructed.

The liquid crystal composition of the present invention consists of a mixture comprising compounds of groups (I) through (IV) as mentioned above.

The compound of group (I) is a liquid crystal essential for the construction of the bookshelf structure.

The compound of group (II) is also a liquid crystal essential for the construction of the bookshelf structure, and this liquid crystal is characterized in that the liquid crystal phase transition temperature is relatively broad on the higher-temperature side.

Further, the compound of group (III) is a liquid crystal essential for the construction of the bookshelf structure, and this liquid crystal is characterized in that the viscosity is relatively low.

The compound of group (IV) is used in combination with the compounds of groups (I), (II) and (III), and the main function of this compound is to expand the ferroelectric liquid crystal phase temperature range (driving temperature range).

Namely, to obtain the intended effects of constructing the bookshelf structure and obtaining a high contrast and a stable memory characteristic, the liquid crystal compounds of groups (I), (II) and (III) are indispensable.

In the liquid crystal composition of the present invention, the liquid crystal compound of group (IV) must be incorporated into the liquid crystal compounds of groups (I), (II) and (III), to maintain the characteristics of the liquid crystal at practically satisfactory levels. Namely, although a highest effect of stabilizing the bookshelf structure is obtained when the composition is composed solely of the liquid crystal compounds of groups (I), (II) and (III), the compound of group (IV) is incorporated to realize a practically satisfactory driving temperature range and liquid crystal viscosity and to impart a satisfactory performance to a liquid crystal display.

In general, the bookshelf structure can be constructed most easily in the compound of group (I). Therefore, in principle, use of the compound of group (I) in a large amount is preferable. Nevertheless, since the viscosity of the naphthalene type liquid crystal is high, a practically applicable composition is formed by the incorporation of the compound of group (IV). The compound of group (II) is a liquid crystal which is especially effective for expanding the driving temperature range toward the high-temperature side. Among naphthalene type liquid crystals, the compound of group (III) has a low viscosity and is effectively used when an extreme reduction of the viscosity is desired. In practice, since the viscosity can be reduced to some extent by mixing the compounds of groups (I), (II) and (III), it is possible to mix all or parts of the compounds of groups (I), (II), (III) and (IV) and use the mixture.

Preferably, the liquid crystal compounds of groups (I), (II) and (III) are used in amounts as large as possible, as long as the viscosity and driving temperature range are practically satisfactory. Namely, each of the compounds of groups (I), (II) and (III) is preferably used in an amount of 5 to 60% by weight, with the balance being the compound of group (IV). Since each of the compounds of groups (I), (II) and (III) has a high viscosity, if the amount of any of the compounds of groups (I), (II) and (III) exceeds 60% by weight, the response time becomes too long and the liquid crystal composition cannot be practically used. If the amount of any of the compounds of groups (I), (II) and (III) is smaller than 5% by weight, the effect of constructing the bookshelf structure is not satisfactory.

In the compound of group (I) constituting the liquid crystal composition of the present invention, $R_1$ is preferably an alkyl group having six to sixteen carbon atoms or an alkoxy group having six to sixteen carbon atoms and especially preferably an alkyl group having 8 to 14 carbon atoms or an alkoxy group having 8 to 14 carbon atoms. $R_2$ is preferably an alkyl group having at least one asymmetric carbon atom and 4 to 13 carbon atoms, especially 5 to 9 carbon atoms, which may be substituted with an alkoxy group having 1 to 6 carbon atoms.

In the compound of group (II), $R_3$ is preferably an alkyl group having 6 to 16 carbon atoms or an alkoxy group having 6 to 16 carbon atoms, and especially preferably an alkyl group having 8 to 14 carbon atoms or an alkoxy group having 8 to 14 carbon atoms. $R_4$ is preferably an alkyl or alkoxy group having at least one asymmetric carbon atom and 4 to 13 carbon atoms, especially 5 to 9 carbon atoms.

In the compound of formula (III), $R_5$ is preferably an alkyl group having 6 to 16 carbon atoms or an alkoxy group having 6 to 16 carbon atoms, and especially preferably an alkyl group having 8 to 14 carbon atoms or an alkoxy group having 8 to 14 carbon atoms. $R_6$ is preferably an alkyl or alkoxy group having at least one asymmetric carbon atom and 4 to 13 carbon atoms, especially 5 to 9 carbon atoms.

In the compound of group (IV), $R_8$ and $R_9$ each represent an alkyl group having preferably 6 to 16 carbon atoms, especially preferably 8 to 12 carbon atoms. $R_7$ represents an alkyl group having at least one asymmetric carbon atom and preferably 4 to 13 carbon atoms, especially preferably 5 to 9 carbon atoms.

Note, the halogen atom as the element to be bonded to the asymmetric carbon atom is, for example, chlorine or bromine.

In the compound of group (V), $R_{10}$ is preferably an alkyl group having 6 to 16 carbon atoms or an alkoxy group having 6 to 16 carbon atoms and especially preferably an alkyl group having 8 to 14 carbon atoms or an alkoxy group having 8 to 14 carbon atoms. $R_{11}$ represents an alkyl group having at least one asymmetric carbon atom and having preferably 4 to 13 carbon atoms, especially preferably 5 to 9 carbon atoms.

Preferable amounts of the compounds of groups (I) through (V) are now described. The preferable amount of the compound of group (I) is 10 to 50% by weight, the preferable amount of the compound of group (II) is 10 to 30% by weight, the preferable amount of the compound of group (III) is 5 to 30% by weight, the preferable amount of the compound of group (IV) is 10 to 60% by weight, and the preferable amount of the compound of group (V) is 20 to 40% by weight.

The liquid crystal of group (IV) is used in combination with the liquid crystals of groups (I) through (III) or with the liquid crystals of groups (I) through (III) and (V) and exerts a function of expanding the ferroelectric liquid crystal phase temperature range. Accordingly, the mixing ratio of the liquid crystal of group (IV) is changed according to the desired ferroelectric liquid crystal phase temperature range. Since a temperature range of from about −10° C. to about 60° C. is generally required, the amount added of the liquid crystal of group (IV) should be adjusted to 5 to 70% by weight according to the characteristics of the liquid crystal mixture of the liquid crystals of groups (I) through (III) or (I) through (III) and (V). If the amount of the liquid crystal of group (IV) is smaller than 5% by weight, the effect of expanding the liquid crystal phase temperature range, especially on the low-temperature side, is poor, and if the amount of the liquid crystal of group (IV) is larger than 70% by weight, it becomes impossible to maintain the bookshelf structure.

The liquid crystal of group (V) is used in an amount of 5 to 40% by weight, preferably 20 to 40% by weight, mainly for obtaining a sufficient spontaneous polarization. If the amount of the liquid crystal of group (V) is smaller than 5% by weight, a satisfactory effect of increasing the spontaneous polarization cannot be obtained, and if the amount of the liquid crystal of group (V) is larger than 40% by weight, the viscosity of the liquid crystal composition becomes too high and it is difficult to maintain the bookshelf structure.

The present invention will now be described in detail with reference to the following preferred examples, that by no means limit the scope of the invention.

EXAMPLE 1

A liquid crystal composition (hereinafter referred to a "composition 1") was obtained by mixing the following compounds of groups (I) through (IV) in the amounts described below.

Composition 1

Group (I):
40% by weight of

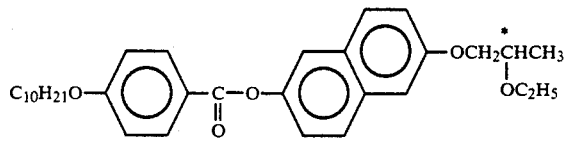

Group (II):
10% by weight of

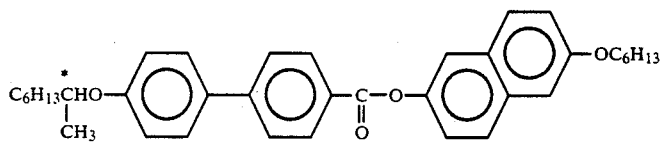

Group (III):
10% by weight of

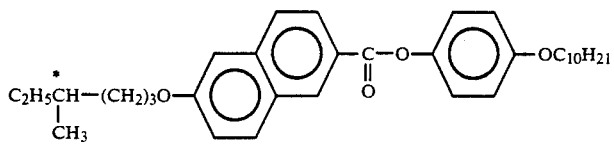

Group (IV):
30% by weight of

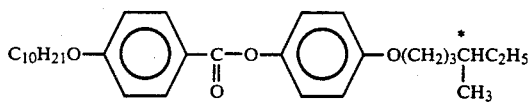

Group (IV):
10% by weight of

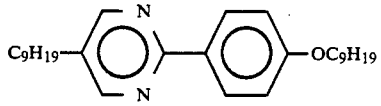

EXAMPLE 2

A liquid crystal composition (hereinafter referred to as "composition 2") was obtained by mixing the following compounds of groups (I) through (IV) in the amounts shown below.

Composition 2

Group (I):
50% by weight of

Composition 2

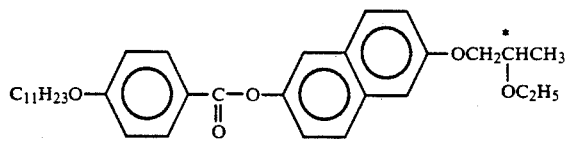

Group (II):
20% by weight of

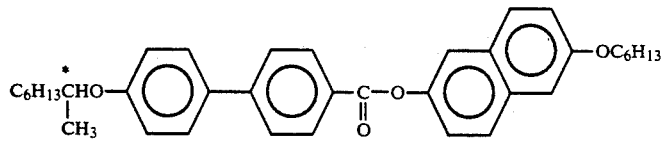

Group (III):
20% by weight of

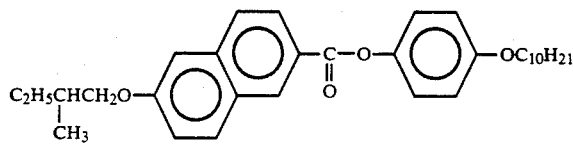

Group (IV):
10% by weight of

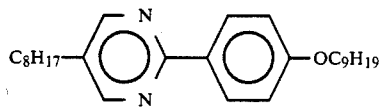

EXAMPLE 3

A liquid crystal composition (hereinafter referred to as "composition 3") was obtained by mixing the following compounds of groups (I) through (IV) in the amounts described below.

Composition 3

Group (I):
15% by weight of

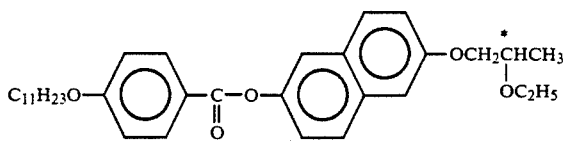

Group (II):
15% by weight of

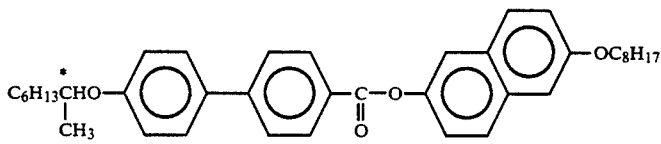

Group(III):
15% by weight of

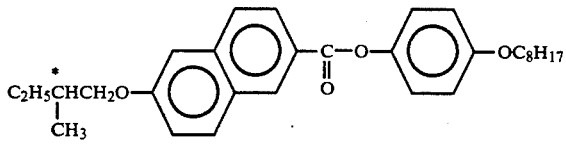

Group (IV):
45% by weight of

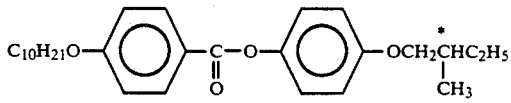

Composition 3

Group (IV):
10% by weight of

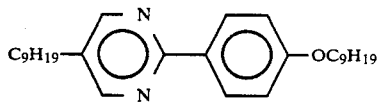

EXAMPLE 4

A liquid crystal composition (hereinafter referred to as "composition 4") was obtained by mixing the following compounds of groups (I) through (V) in the amounts described below.

Composition 4

Group (I):
30% by weight of

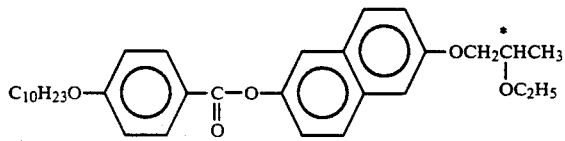

Group (II):
10% by weight of

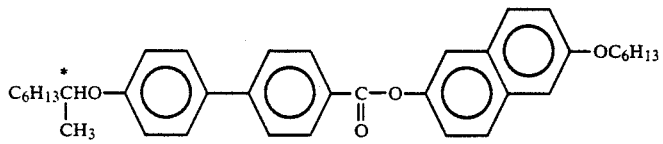

Group (III):
10% by weight of

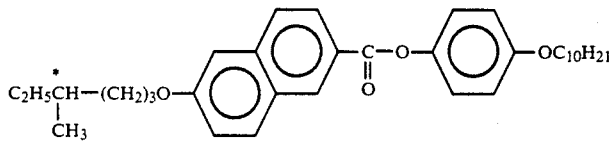

Group (IV):
30% by weight of

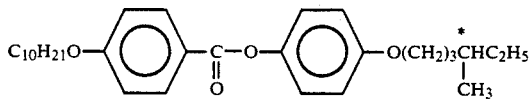

Group (IV):
5% by weight of

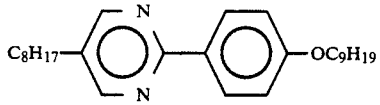

Group (IV):
5% by weight of

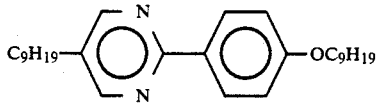

Group (V):
10% by weight of

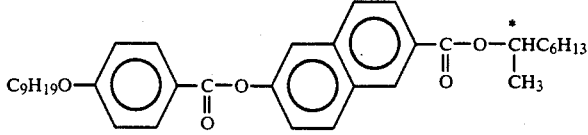

EXAMPLE 5

A liquid crystal composition (hereinafter referred to as "composition 5") was obtained by mixing the following compounds of groups (I) through (V) in the amounts described below.

Composition 5

Group (I):
15% by weight of

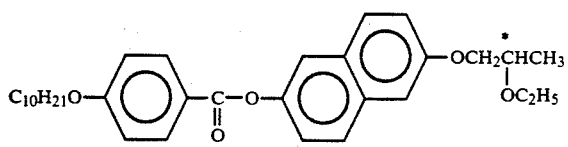

Group (II):
15% by weight of

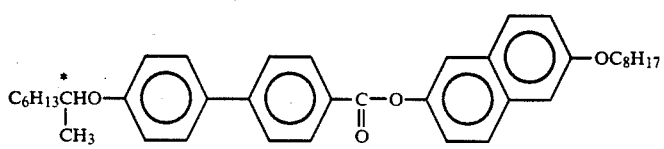

Group (III):
15% by weight of

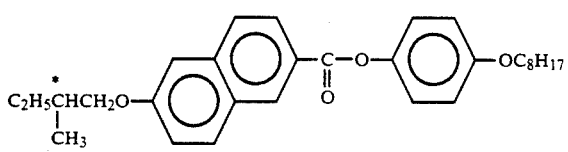

Group (IV):
30% by weight of

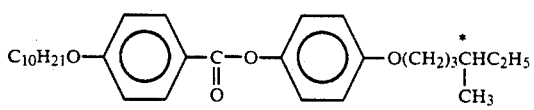

Group (IV):
10% by weight of

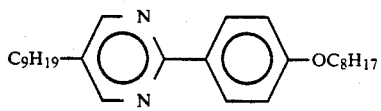

Group (V):
15% by weight of

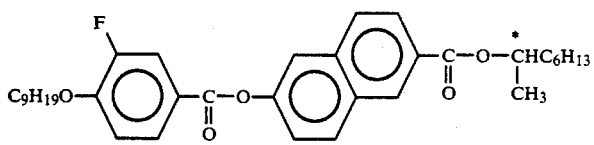

EXAMPLE 6

A liquid crystal composition (hereinafter referred to as "composition 6") was obtained by mixing the following compounds of groups (I) through (V) in the amounts described below.

Composition 6

Group (I):
15% by weight of

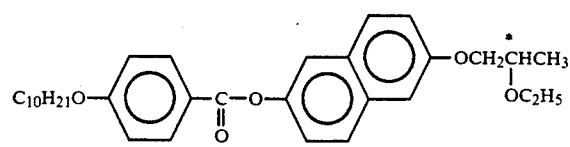

Group (II):
15% by weight of

Composition 6
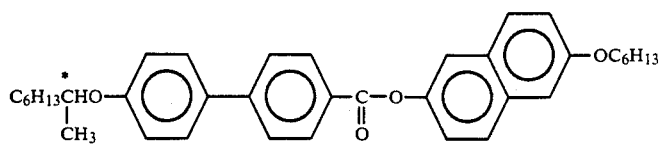
Group (III):
20% by weight of
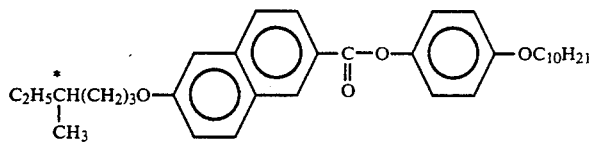
Group (IV):
20% by weight of
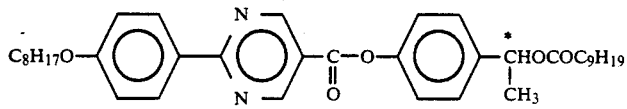
Group (V):
30% by weight of
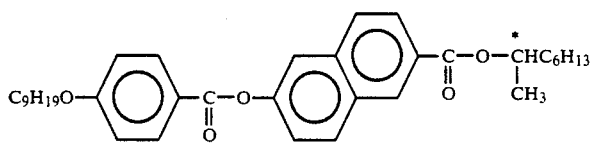
EXAMPLE 7
A liquid crystal composition (hereinafter referred to as "composition 7") was obtained by mixing the following compounds of groups (I) through (V) in the amounts described below.
Composition 7
Group (I):
15% by weight of
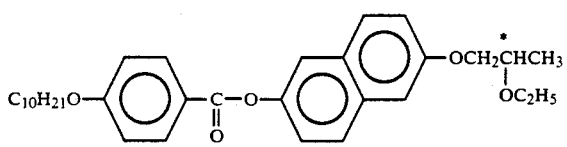
Group (II):
15% by weight of
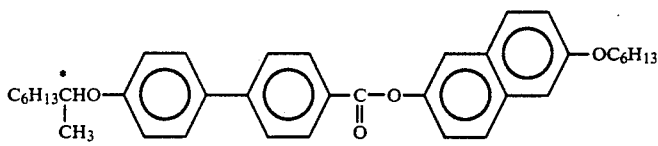
Group (III):
20% by weight of
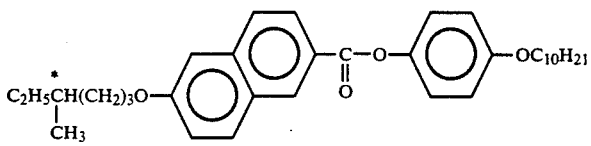
Group (IV):
20% by weight of
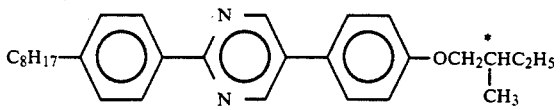

Composition 7

Group (V):
30% by weight of

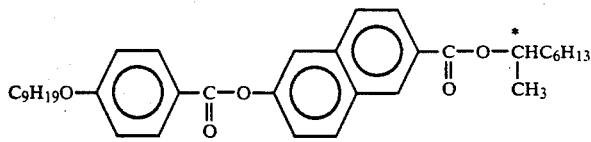

In the following comparative examples, liquid crystal compositions lacking one or more of the indispensable components of the liquid crystal composition of the present invention were prepared.

COMPARATIVE EXAMPLE 1

A liquid crystal composition (hereinafter referred to as "composition 8") was prepared according to the following recipe, without using the compound of group (II).

Composition 8

Group (I):
20% by weight of

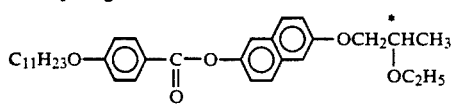

Group (III):
10% by weight of

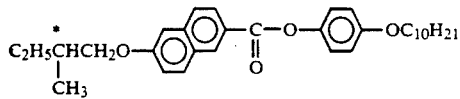

Group (V):
10% by weight of

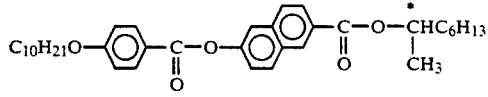

Group (IV):
60% by weight of

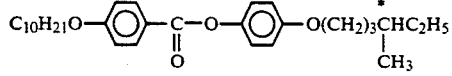

COMPARATIVE EXAMPLE 2

A liquid crystal composition (hereinafter referred to as "composition 9") was prepared according to the following recipe, without using the compounds of groups (II) and (III).

Composition 9

Group (I):
30% by weight of

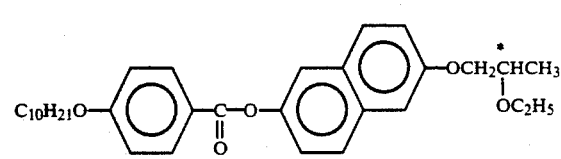

Group (IV):
10% by weight of

Composition 9 -continued

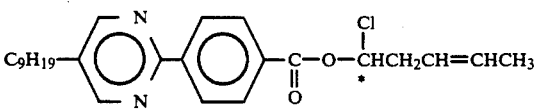

Group (IV):
20% by weight of

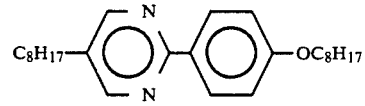

Group (IV):
30% by weight of

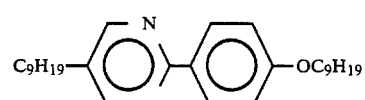

Group (IV):
10% by weight of

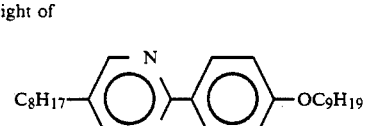

COMPARATIVE EXAMPLE 3

A liquid crystal composition (hereinafter referred to as "composition 10") was prepared according to the following recipe, without using the compounds of groups (II) through (IV).

Composition 10

Group (I):
30% by weight of

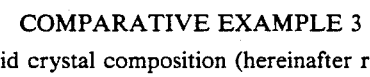

Group (I):
40% by weight of

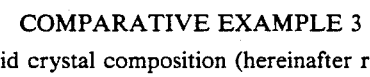

Group (V):
30% by weight of

-continued
Composition 10

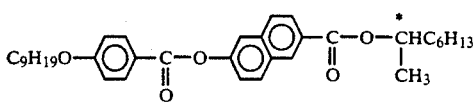

COMPARATIVE EXAMPLE 4

A liquid crystal composition (hereinafter referred to a "composition 11") was prepared by using only the compounds of group (I), without using the compounds of groups (II) through (IV).

Composition 11
Group (I):
40% by weight of

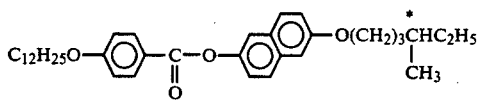

Group (I):
30% by weight of

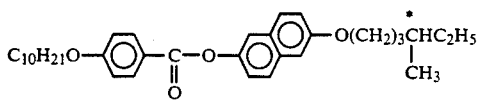

Group (I):
30% by weight of

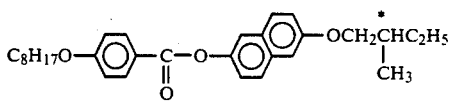

EXAMPLE 8

Evaluation Panel

With respect to each of the liquid crystal compositions obtained in the foregoing examples and comparative examples, the display characteristics were evaluated by using the following evaluation panel. A transparent electrode-attached glass substrate having a size of 50 mm × 60 mm and a thickness of 1.1 mm was used, and PVA (polyvinyl alcohol) was used as the liquid crystal-orienting film. The PVA film had been subjected to the rubbing treatment, and the panel gap was adjusted to 2.0 μm. A liquid crystal composition shown in Table 1 was sealed in this panel and the electro-optical response characteristics thereof were evaluated.

A liquid crystal display device according to the present invention is constructed as follows. Ferroelectric liquid crystal composition according to the present invention is charged in the enclosed space formed between first and second transparent substrates substantially in parallel each other, and a spacer inserted between the substrates.

Transparent electrodes are formed on the internal surface of the substrate spatially and in the line, and each transparent electrode formed on each substrate is aligned perpendicularly to the other, to thereby form a matrix addressed display.

Each of the terminals of the first switching means is electrically connected to one of the first transparent electrodes, and each of the terminals of the second switching means is electrically connected to one of the second transparent electrodes. The terminal of the first switching means and the terminal of the second switching means are connected to opposite terminals of a voltage source. The first second switching means include means for applying the voltage from the voltage source across any of the first transparent electrodes and any of the second transparent electrodes.

Evaluation Items (1) Each evaluation panel was observed in the cross Nicol state by a microscope, to examine the uniformity of the orientation of liquid crystal molecules. Namely, the presence or absence of zigzag defects and the change of the light transmission according to the place were checked. The change of the light transmission according to the place is shown as the in-plane uniformity in Table 1. The in-plane uniformity was evaluated according to the following procedures.

Namely, the display plane (transparent electrode matrix) was divided into 5×5 (=25) spots. The light transmission at each spot was compared with the mean value of the light transmissions at the respective spots, and the ratio (%) of the difference between the light transmission at each spot and the mean value to the mean value was calculated.

The memory stability (memory retention ratio) was evaluated according to the following procedures.

Namely, pulse waves having a length of 400 μs and a wave height of 15 V were applied to each panel, and the light transmission after 0.5 second was compared with the light transmission at the time of the application of the pulse, and the ratio (%) of the light transmission after 0.5 second to the light transmission at the time the application of the pulse was calculated. The higher the light transmission after 0.5 second, the greater the memory stability.

Furthermore, the contrast ratio was evaluated based on the ratio of the light transmission in the "on" state and the light transmission in the "off" state at the time of the memory, i.e., after 0.5 second.

(2) Evaluation of Driving Temperature Range of Ferroelectric Liquid Crystal

The ferroelectric liquid crystal display is different from the STN liquid crystal display in that not only the temperature range showing the liquid crystal state but also the temperature range where in a reversal of the polarization is possible, is important. Namely, if the reversal of the spontaneous polarization is not sufficient, the contrast and memory effect are not satisfactory, and the characteristics of the liquid crystal as the display element are poor.

Accordingly, the practical driving temperature range of the ferroelectric liquid crystal is an important factor in the evaluation of the liquid crystal composition. In the present example, the driving temperature range was determined according to the following conditions.

PVA was coated on a transparent electroconductive film-attached glass substrate having a size of 60 mm × 50 mm and a thickness of 1.1 mm, the rubbing treatment was carried out, and each liquid crystal composition was sealed into a cell sandwiching the substrate using an SiO₂ sphere having an average diameter of 1.6 μm as the spacer, to thereby fabricate a panel. The panel gap was 2.0 to 2.2 μm.

The panel was placed in a constant-temperature thermostat tank and the electric-optical characteristics were measured by using an He-Ne laser as the light source. The driving was effected by applying pulse waves having a length of 400 μs at intervals of 0.5 second on the positive and negative sides alternately. The wave height was 15 V (±15 V). The temperature range wherein the contrast ratio of the electro-optical response was at least 5/1 at the time of driving was designated as the driving temperature range.

The viscosity was measured at 25° C., by the triangular wave method.

The results of the measurements of the respective items are shown in Table 1.

TABLE 1

| Composition No. | Zigzag Defects | In-Plane Uniformity (%) | Contrast Ratio | Memory Retention Ratio (%) | Driving Temperature Range (°C.) | Viscosity (mPa · s, 25° C.) |
| --- | --- | --- | --- | --- | --- | --- |
| 1 | not found | <5 | 25 | 97 | 10–42 | 453 |
| 2 | " | <5 | 20 | 93 | 10–40 | 530 |
| 4 | " | <5 | 22 | 95 | 5–43 | 431 |
| 6 | " | <5 | 22 | 98 | 5–42 | 420 |
| 7 | " | <5 | 25 | 97 | 4–41 | 410 |
| 8 | " | <5 | 17 | 88 | 15–30 | 895 |
| 9 | " | <5 | 18 | 90 | 14–27 | 90 |
| 10 | " | −8 | 15 | 92 | 35–40 | 480 |
| 11 | " | −8 | 12 | 93 | 29–38 | 530 |
| conventional liquid crystal* | found | 15–25 | 1 | 0 | 5–45 | 250 |

Note
*phenylpyrimidine type mixed liquid crystal

Note, the viscosity of the liquid crystal composition (composition 9) of Comparative Example 2 is low. This is because, since the driving temperature range is narrow and the measurement temperature of 25° C. is close to the smectic phase-showing temperature, the viscosity is low. From the practical viewpoint, preferably the driving temperature range is at least from 10° to 40° C. and the viscosity at 25° C. is 400 to 550 mPa.s.

Each of the compositions of Examples 1, 2, 4, 6 and 7 satisfies these requirements.

From the results shown in Table 1, it is understood that the liquid crystal composition of the present invention is superior to the comparative liquid crystal compositions in all of the contrast ratio, the memory retention ratio, and the driving temperature range.

EXAMPLE 9

In the present example, it was determined whether or not the liquid crystal composition of the present invention actually had the bookshelf structure.

In general, the layer spacing in the layer structure of a ferroelectric liquid crystal is scores of Å, typically, thirty Å, and therefore, the structure can be confirmed by a usual X-ray diffractometry. Since an X-ray peak corresponding to the layer spacing is obtained by the transmission X-ray diffractometry, in the bookshelf structure shown in FIG. 1, a peak is obtained only when an X-ray is incident at an angle corresponding to the Bragg angle ($2d\sin\theta = n\lambda$). Therefore, a single peak is obtained in the case of the bookshelf structure.

In contrast, in the case of the chevron structure shown in FIG. 2, peaks are obtained at Bragg angles corresponding to both "/" and " \ " in the layer bent in the <-shaped form; i.e., double peaks are observed.

Note, double peaks are observed in conventional liquid crystals, as shown in Yukio Ouchi et al, Japanese Journal of Applied Physics, 27, 11, L1993 L1995. (An example taught in this reference is shown in FIG. 3.)

Figure 4:
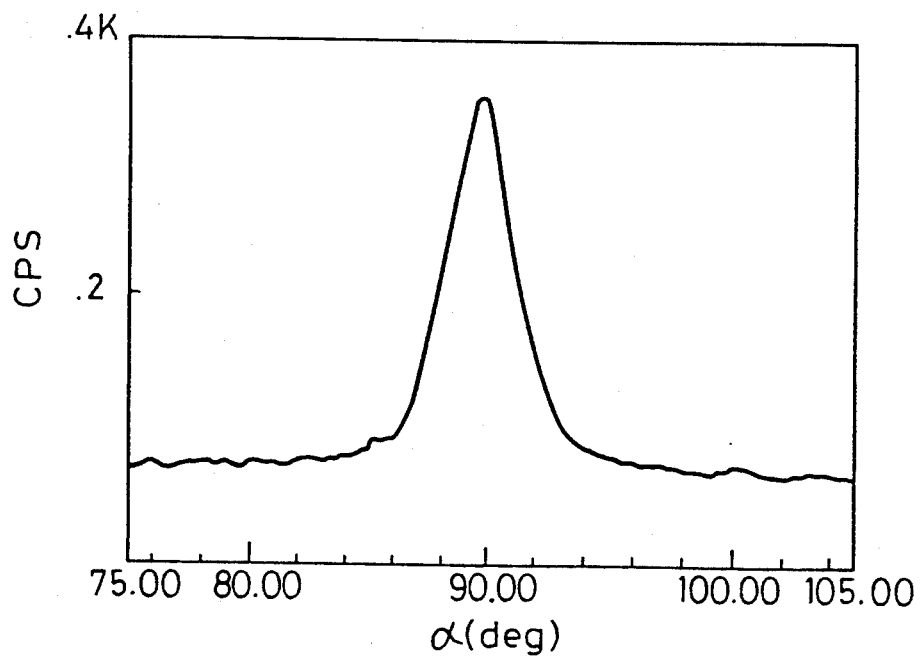
FIG. 4 illustrates an X-ray diffraction pattern of the liquid crystal composition of the present invention.

As apparent from FIG. 4, in the liquid crystal composition (composition 1) of the present invention, a single peak is obtained in the X-ray diffraction pattern, and accordingly, it is confirmed that the liquid crystal composition of the present invention has the bookshelf structure.

Figure 3:
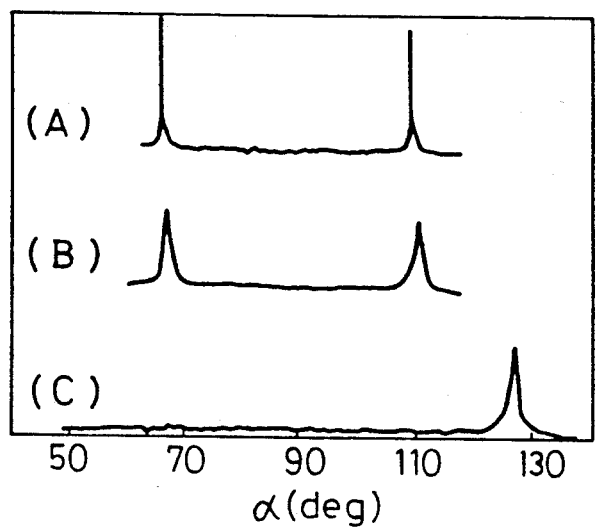
FIG. 3 illustrates an X-ray diffraction pattern of a conventional liquid crystal.

Note, in FIGS. 3 and 4, $\alpha$ indicates the rotation angle of the liquid crystal cell to the incident direction of X-rays, which corresponds to the leaning angle of the liquid crystal layer to the substrate.

As apparent from the foregoing description, according to the present invention, a liquid crystal composition is formed by adding a predetermined amount of a ferroelectric liquid crystal having a specific structure to conventional liquid crystals, so that the liquid crystal composition has the bookshelf structure. Accordingly, in the liquid crystal composition of the present invention, the viscosity is relatively low even in a low-temperature region and driving is possible in this low-temperature region. Furthermore, the liquid crystal composition of the present invention has a very good orientation uniformity as the liquid crystal and further, has a high memory stability.

The inventors used a liquid crystal molecular orientation using a mixture of a naphthalene system ferroelectric liquid crystal:

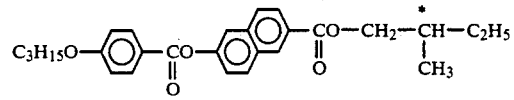

which showed a high degree of flatness in the core structure of the liquid crystal molecule, and obtained a zigzag defect-free alignment with a rubbed polyvinyl alcohol cell with a 2 μm gap. The inventors also used a liquid crystal molecular orientation using a mixture of a naphthalene system and phenylpyrimidine system ferroelectric liquid crystals, and obtained a zigzag defect-free alignment with the same type of cell.

Figure 5:
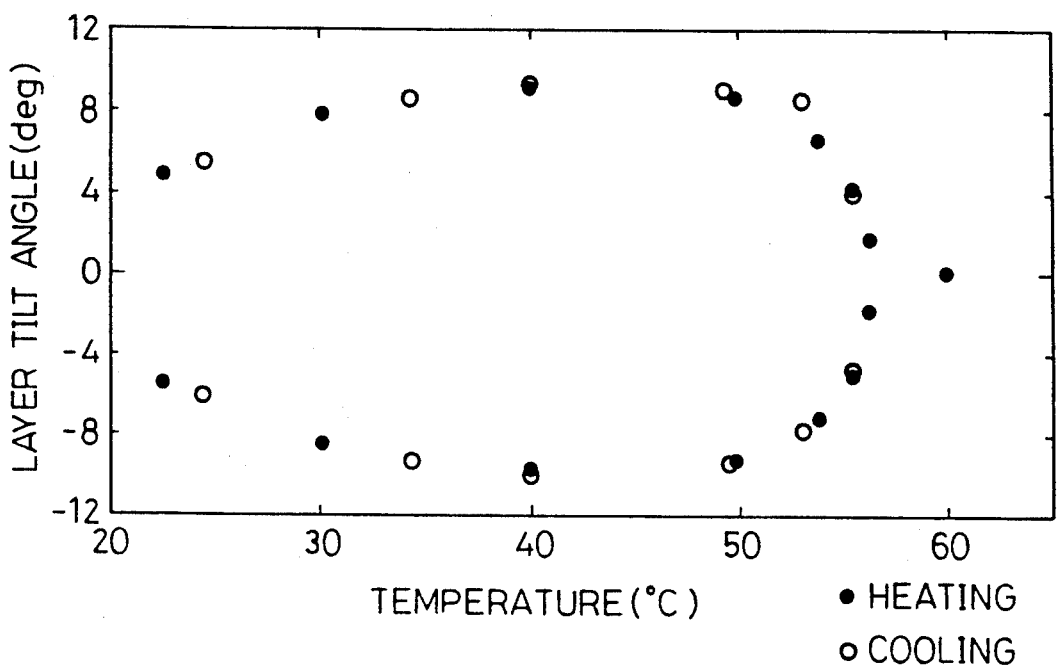
FIG. 5 is a graph showing the relationship between a layer tilt angle and a temperature of the present liquid crystal composition.
Figure 6:
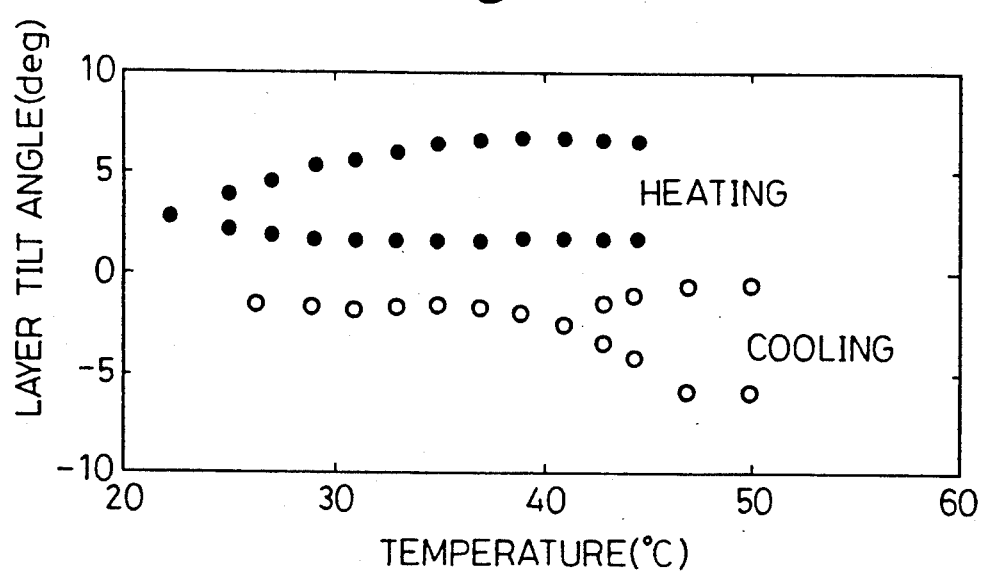
FIG. 6 is a graph showing the relationship between between a layer tilt angle and a temperature of the present liquid crystal composition.

The inventors investigated the temperature dependence of the smectic layer structure of these cells, by X-ray diffraction experiment, and the results are shown in FIG. 5 and 6. These results are quite different from previously reported X-ray diffraction experiment results. (T. P. Rieker, N. A. Clark, G. S. Smith, D. S. Parmer, E. B. Sirota and C. R. Safinya, Phys. Rev. Lett. 59 2658 (1987)).

Figure 7:
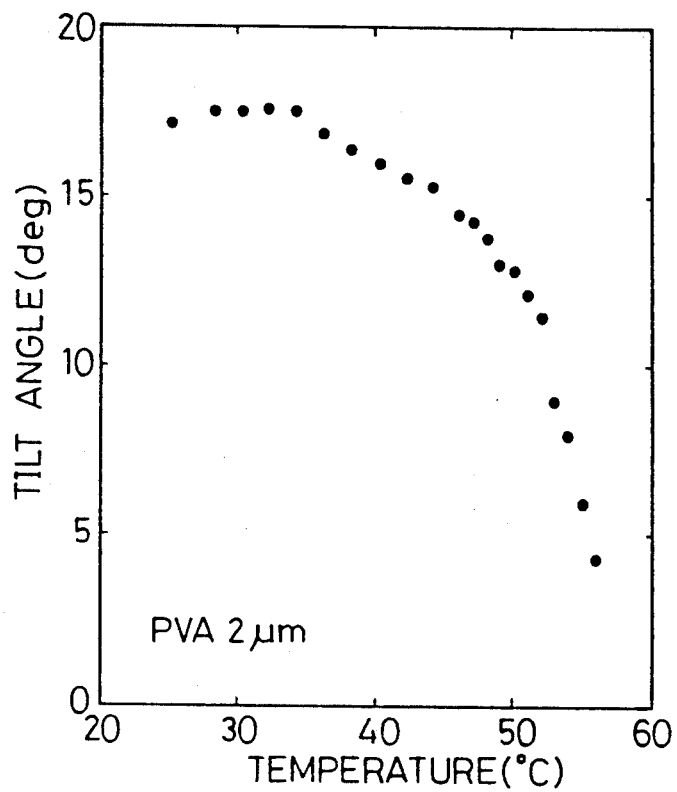
FIG. 7 a graph showing the relationship between a tilt angle and a temperature of the present liquid crystal composition.

FIG. 5 shows a chevron structure, but unlike the usual smectic liquid crystals, the layer tilt angle increases near the $S_A$ to $S_C^*$ transition temperature, then decreases with a lowering of the temperature. This temperature dependence of the layer tilt angle does not coincide with the temperature dependence of the molecular tilt angle shown in FIG. 7 and this lack of coincidence suggests that the interaction between the naphthalene system liquid crystal molecule and the substrate surface is strong enough to anchor the liquid crystal molecule near the substrate with a very low pretilt. This strongly anchored liquid crystal molecule could possibly decrease the layer tilt of the chevron structure to make bookshelf structure.

Another possibility exits in that the molecular axes of the naphthalene system liquid crystal are not straight, making the molecular rotation of the naphthalene system liquid crystal different from the conventional liquid crystal molecular rotation. This rotational difference too might induce a bookshelf structure.

Figure 8:
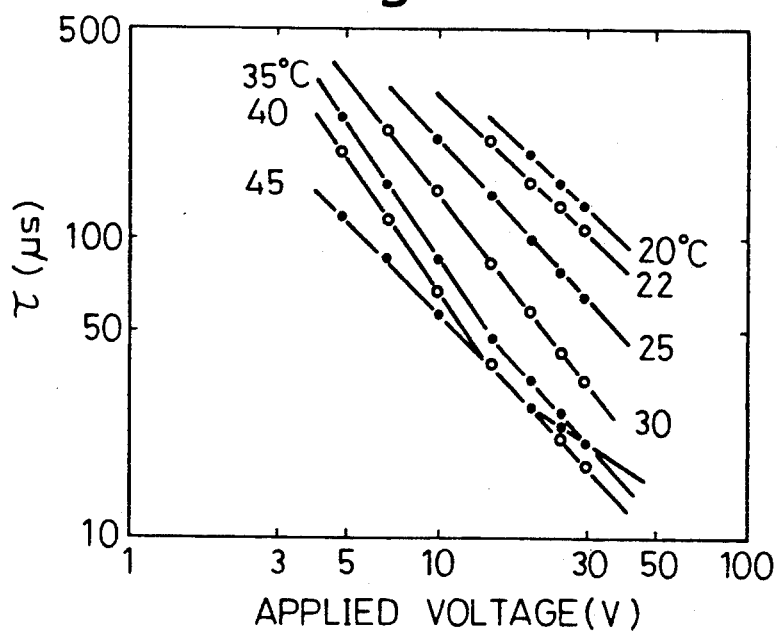
FIG. 8 is a graph showing the relationship between the response time and the applied voltage.

FIG. 6 shows a bookshelf structure. As shown in the FIG. 6, the smectic layer is almost perpendicular to the substrates. These layer structures made it possible to clarify the relationship between the electro-optical properties and the smectic layer structure. FIG. 8 shows that the optical switching time is proportional to the applied electric field strength in the region where the smectic layer tilt angle is small. When the layer tilt is large, i.e., a chevron structure, the optical switching time is not proportional to the applied voltage. Therefore, a comparison of FIGS. 7 and 8 indicates that the obtained bookshelf structure is a almost identical to Clark and Lagerwall's model.

Figure 9:
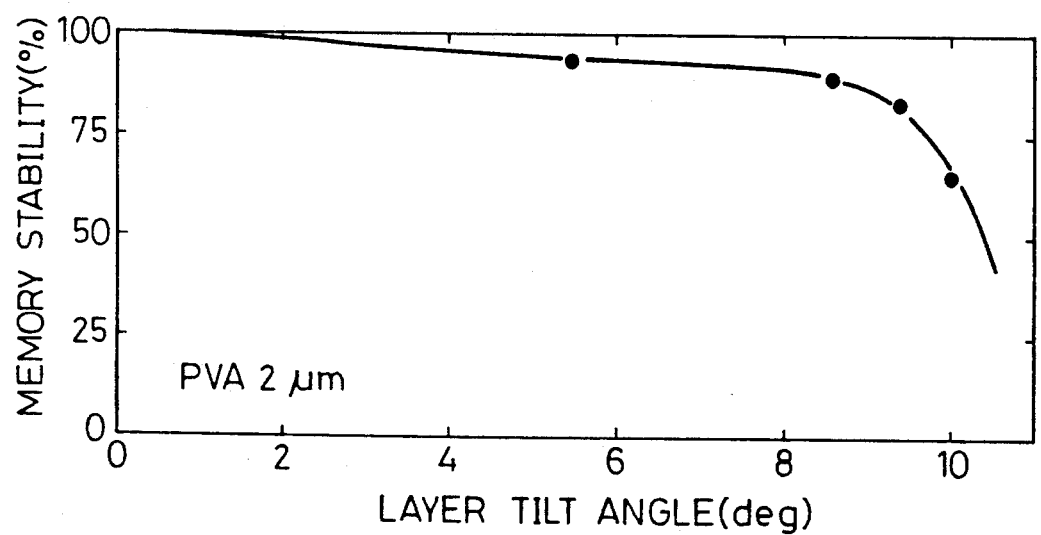
FIG. 9 is a graph showing the relationship between the memory stability and the layer tilt angle.

The bistability of the SSFLCD is also obviously related to the layer structure, as shown in FIG. 9. In FIG. 9 "memory stability" means the ratio between the light transmittance 0.5 seconds after removing the drive voltage and the transmittance when the drive voltage is applied. FIG. 9 shows that a smaller tilt angle produces a more stable memory effect.

In the course of those investigations, the inventors clarified that the bookshelf structure has superior optical switching and memory properties, and further clarified that the naphthalene system material gives us a bookshelf layer structure with a rubbed polymer film cell.

In 1980, Clark and Lagerwall reported some advantages of the surface stabilized ferroelectric liquid crystal cells with the bookshelf smectic layer structure model, and since then much research has been carried out. Nevertheless, the bookshelf structure proposed by Clark and Lagerwall with rubbed polymer cells has never been reported, and the naphthalene system material is the first ferroelectric liquid crystal to realize the bookshelf structure with rubbed polymer cells.

Due to the realization of a bookshelf structure and a low layer tilt chevron structure by the naphthalene system liquid crystals, the inventors obtained the following four effective items.

(1) An investigation can be made into the detailed relationship between the smectic layer structure and the electro-optical properties.

(2) An investigation also can be made into the temperature dependence of the bookshelf layer structure.

(3) The zigzag defects-free alignment of the $S_C^*$ liquid crystal cells can provide a high contrast black and white display.

(4) A bookshelf smectic layer structure is obtained with a rubbed polymer cell and is suitable for mass productions.

We claim:

1. A liquid crystal composition comprising (I) 5 to 60% by weight of at least one member selected from the group consisting of compounds represented by the following formula (I):

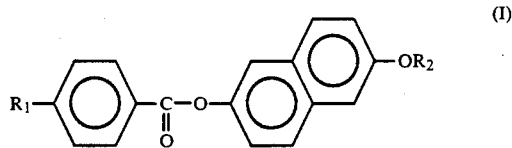

wherein $R_1$ represents an alkyl or alkoxy group having 6 to 16 carbon atoms, and $R_2$ represents an alkyl group having at least one asymmetric carbon atom and 4 to 13 carbon atoms, which may be substituted with an alkoxy group having 1 to 6 carbon atoms, (II) 5 to 60% by weight of at least one member selected from the group consisting of compounds represented by the following general formula (II):

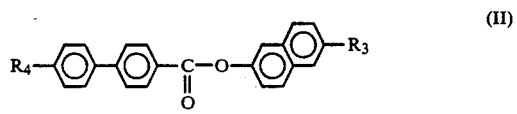

wherein $R_3$ represents an alkyl or alkoxy group having 6 to 16 carbon atoms, and $R_4$ represents an alkyl or alkoxy group having at least one asymmetric carbon atom and 4 to 13 carbon atoms, (III) 5 to 60% by weight of at least one member selected from the group consisting of compounds represented by the following formula (III):

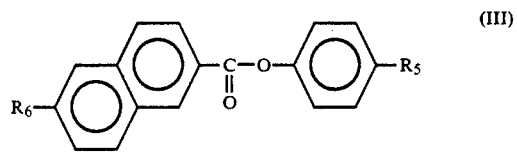

wherein $R_5$ represents an alkyl or alkoxy group having 6 to 16 carbon atoms, and $R_6$ represents an alkyl or alkoxy group having at least one asymmetric carbon atom and 4 to 13 carbon atoms, and (IV) 5 to 70% by weight of at least one member selected from the group consisting of compounds represented by the following formulae (IV-1) through (IV-5):

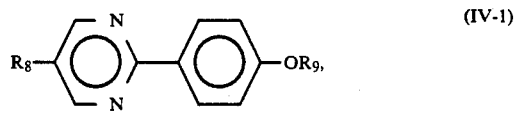

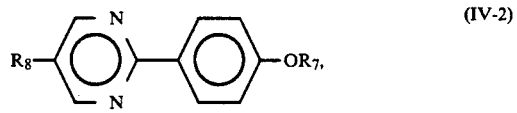

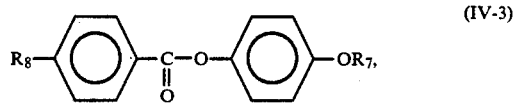

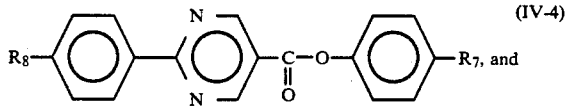

-continued

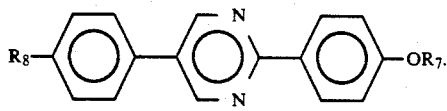
(IV-5)

wherein $R_8$ and $R_9$ represent an alkyl group having 6 to 16 carbon atoms, and $R_7$ represents an alkyl group having at least one asymmetric carbon atom and 4 to 13 carbon atoms.

2. A liquid crystal composition as set forth in claim 1, which further comprises (V) 5 to 40% by weight of at least one member selected from the group consisting of compounds represented by the following formulae (V-1) and (V-2):

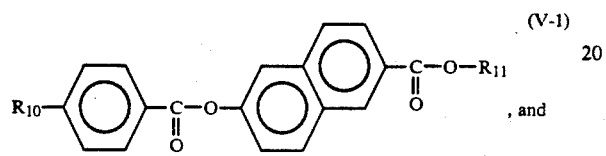
(V-1)

, and

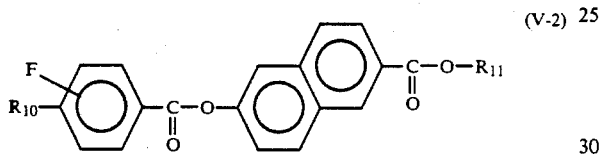
(V-2)

wherein $R_{10}$ represents an alkyl or alkoxy group having 6 to 16 carbon atoms, and $R_{11}$ represents an alkyl group having at least one asymmetric carbon atom and 4 to 13 carbon atoms, in addition to said compounds (I) through (IV).

3. A liquid crystal composition as set forth in claim 1, wherein the content of the compound of group (I) is 10 to 50% by weight.

4. A liquid crystal composition as set forth in claim 1, wherein the content of the compound of group (II) is 10 to 30% by weight.

5. A liquid crystal composition as set forth in claim 1, wherein the content of the compound of group (III) is 5 to 30% by weight.

6. A liquid crystal composition as set forth in claim 1, wherein the content of the compound of group (IV) is 10 to 60% by weight.

7. A liquid crystal composition as set forth in claim 1, wherein the content of the compound of group (I) is 10 to 50% by weight, the content of the compound of formula (II) is 10 to 30% by weight, the content of the compound of group (III) is 5 to 30% by weight, and the content of the compound of group (IV) is 10 to 60% by weight.

8. A liquid crystal composition as set forth in claim 2, wherein the content of the compound of group (V) is 20 to 40% by weight.

9. A liquid crystal composition as set forth in claim 2, wherein the content of the compound of group (I) is 10 to 50% by weight, the content of the compound of group (II) is 10 to 30% by weight, the content of the compound of group (III) is 5 to 30% by weight, the content of the compound of group (IV) is 10 to 60% by weight, and the content of the compound of group (V) is 20 to 40% by weight.

10. A ferroelectric liquid crystal display device, comprising:

a liquid crystal panel, comprising:
a first transparent substrate;
a second transparent substrate substantially in parallel with the first transparent substrate;
first transparent electrode means formed on the internal surface of said first transparent substrate;
second transparent electrode means formed on the internal surface of said second transparent substrate;
a spacer between the first and second transparent substrates, said first and second transparent substrates and said spacer forming an enclosed space, said first and second transparent electrodes each having an internal surface facing the enclosed space;
first liquid crystal orienting means formed on the internal surface of said first transparent substrate;
second liquid crystal orienting means formed on the internal surface of said second transparent substrate;
a ferroelectric liquid crystal having a spontaneous polarization and forming a bookshelf smectic-C layer structure, charged in the enclosed space; and
means for causing the liquid crystal at selected portions of the panel to have a polarization of the liquid crystal molecules oriented in one direction and the liquid crystal at other portion of the panel to have a polarization of the liquid crystal molecules oriented in one direction and the liquid crystal at other portions of the panel to have a polarization of the liquid crystal molecules oriented in a reverse direction thereto, comprising means for applying a pulse wave form electric field alternately to the positive and negative sides by applying a pulse wave form electric voltage across the first and second electrodes, wherein said ferroelectric liquid crystal is a chrial smectic-C liquid crystal composition comprising (I) 5 to 60% by weight of at least one member selected from the group consisting of compounds represented by the following formula (I):

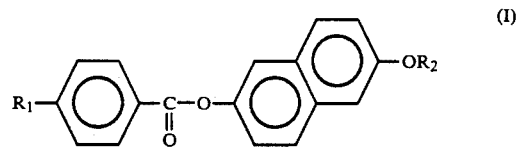
(I)

wherein $R_1$ represents an alkyl or alkoxy group having 6 to 16 carbon atoms, and $R_2$ represents an alkyl group having at least one asymmetric carbon atom and 4 to 13 carbon atoms, which may be substituted with an alkoxy group having 1 to 6 carbon atoms, (II) 5 to 60% by weight of at least one member selected from the group consisting of compounds represented by the following general formula (II):

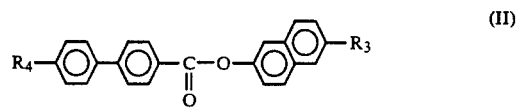
(II)

wherein $R_3$ represents an alkyl or alkoxy group having 6 to 16 carbon atoms, and $R_4$ represents an alkyl or alkoxy group having at least one asymmetric carbon atom and 4 to 13 carbon atoms, (III) 5 to 60% by weight of at least one member selected from the group consisting of compounds represented by the following formula (III):

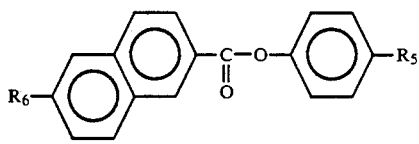

(III)

wherein $R_5$ represents an alkyl or alkoxy group having 6 to 16 carbon atoms, and $R_6$ represents an alkyl or alkoxy group having at least one asymmetric carbon atom and 4 to 13 carbon atoms, and (IV) 5 to 70% by weight of at least one member selected from the group consisting of compounds represented by the following formulae (IV-1) through (IV-5):

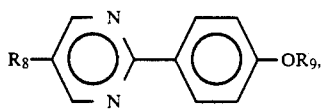

(IV-1)

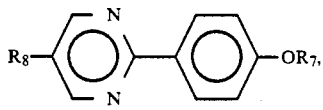

(IV-2)

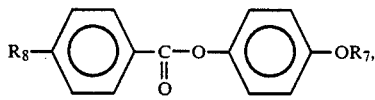

(IV-3)

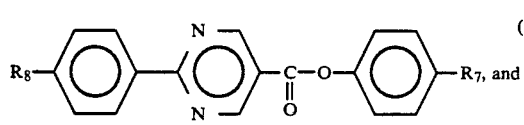

(IV-4)

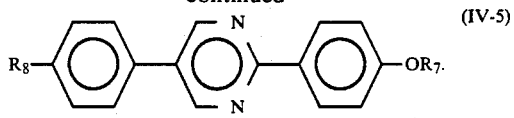

(IV-5)

wherein $R_8$ and $R_9$ represent an alkyl group having 6 to 16 carbon atoms, and $R_7$ represents an alkyl group having at least one asymmetric carbon atom and 4 to 13 carbon atoms.

11. A ferroelectric liquid crystal display device as set forth in claim 10, which further comprises (V) 5 to 40% by weight of at least one member selected from the group consisting of compounds represented by the following formulae (V-1) and (V-2):

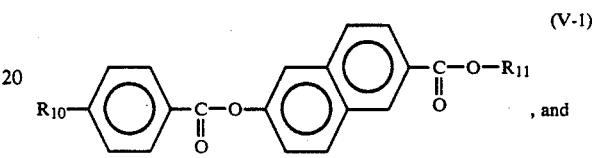

(V-1), and

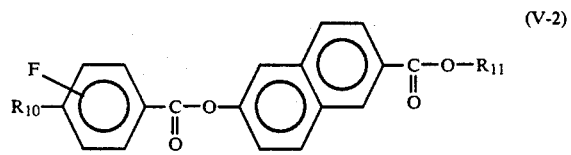

(V-2)

wherein $R_{10}$ represents an alkyl or alkoxy group having 6 to 16 carbon atoms, and $R_{11}$ represents an alkyl group having at least one asymmetric carbon atom and 4 to 13 carbon atoms, in addition to said compounds (I) through (IV).

12. A ferroelectric liquid crystal display device as set forth in claim 10, wherein said bookshelf smectic-C layer structure is perpendicular to said fist and second substrates.

13. A ferroelectric liquid crystal display device as set forth in claim 10, wherein said first and second liquid crystal orienting means comprise a polymer film subjected to the rubbing treatment.

14. A ferroelectric liquid crystal display device as set forth in claim 13, wherein said polymer film is polyvinyl alcohol (PVA), polyimide, or polyamide.

15. A ferroelectric liquid crystal display device as set forth in claim 11, wherein said bookshelf smectic-C layer structure is perpendicular to said first and second substrates.

16. A ferroelectric liquid crystal display device as set forth in claim 11, wherein
said first and second liquid crystal orienting means comprise a polymer film subjected to the rubbing treatment.

* * * * *